United States Patent [19]

Buchanan et al.

[11] 3,895,738

[45] July 22, 1975

[54] GASOLINE DISPENSING SYSTEM

[76] Inventors: George E. Buchanan, 6613 N. Prospect, Oklahoma City, Okla. 73111; Donald R. Krone, 10505 Ridgeview Dr., Oklahoma City, Okla. 73120; Russell R. Krone, 2908 N.W. 28 St., Oklahoma City, Okla. 73107; James E. Noyes, 5817 N.W. 72 St., Oklahoma City, Okla. 73132

[22] Filed: Sept. 20, 1973

[21] Appl. No.: 398,841

[52] U.S. Cl. ................ 222/26; 222/28; 222/76; 235/92 FL; 235/151.34
[51] Int. Cl. .................. G06f 15/56; B67d 5/08
[58] Field of Search ............ 222/23, 24, 25, 26, 27, 222/28, 32, 33, 34, 35, 76; 235/151.34, 92 FL

[56] References Cited
UNITED STATES PATENTS

| | | | |
|---|---|---|---|
| 3,639,735 | 2/1972 | Bickford | 222/26 X |
| 3,696,236 | 10/1972 | Kus | 222/33 X |
| 3,751,642 | 8/1973 | Todd et al. | 222/23 X |

*Primary Examiner*—Stanley H. Tollberg
*Assistant Examiner*—Joseph J. Rolla
*Attorney, Agent, or Firm*—Robert M. Hessin

[57] ABSTRACT

An improved system for dispensing of gasoline and the like which utilizes electronic computational and control devices to meter selected grades of gasoline while accurately computing the money price of dispensed gasoline. The system utilizes meters controlling the flow of multiple grades of gasoline in such manner that gasoline may be dispensed in any of a plurality of separate grades or blended grades, and associated computational equipment driven in response to such metering outputs accurately compute the gallonage delivered for each grade as well as the proportional unit price for the particular selected grade or blend of grades dispensed. The equipment utilizes a plurality of dispensing meters which provide an electronic pulse output for subsequent processing through a multiplexer to derive pulse count for gallonage dispensed from all meters; thereafter, the multiplexed pulse output is utilized in computational equipment to provide count output and display of both gallons dispensed per grade or blend and the price for such dispensing. Central totalizing equipment provides continual count of all gallonage dispensed for each grade from any or all associated dispensers while also providing totalization of the money value of the gallons dispensed.

15 Claims, 10 Drawing Figures

FIG. 10

GASOLINE DISPENSING SYSTEM

CROSS REFERENCE TO RELATED APPLICATION

The present application is related to the subject matter of U.S. Pat. application Ser. No. 290,437 filed on Sept. 20, 1972, now U.S. Pat. No. 3,847,302 in the name of Krone et al and entitled "Gasoline Dispensing System."

FIELD OF THE INVENTION

The invention relates generally to gasoline dispensing systems and, more particularly, but not by way of limitation, it relates to improvements in gasoline dispensing metering and computational apparatus employed in control of the dispensing process.

DESCRIPTION OF THE PRIOR ART

The prior art has seen development of various forms of gasoline metering devices for use in commercial dispensing of gasoline products. Such prior art devices have been largely restricted to mechanical forms of metering and price computation, such counting devices being well-known and utilized in nearly all present day gasoline stations throughout the world. Until the recent advent of solid state electronics and low power requirement components, the prior art devices have been restricted to mechanical forms, as has been dictated by safety requirements which are inherent with exigencies surrounding gasoline handling and dispensing; however, most recently there has been a great amount of activity in the research and development of suitable forms of electronic calcuation devices for use in gasoline dispensing and there are now several electronic systems known and in use. None of the prior art systems known to Applicants achieve operative function in a manner similar to that set forth in the present specification. A foremost teaching, that of the Phillips et al patents, e.g. U.S. Pat. No. 3,130,870, provides an electronic counting system and teaches an electronic pulse metering system utilizing subsequent electronic tally circuitry; but this system differs in that it utilizes pulsed metering, i.e. liquid pulsation at the point of metering, and the system requires that the individual electronic pulse generators at each meter be individually adjusted as to both gallons and money count output.

SUMMARY OF THE INVENTION

The present invention contemplates a gasoline dispensing system wherein an electronic computational device is utilized to yield increased accuracy in tallying and recording the amounts and the price of gas metered from a source reservoir. In a more limited aspect, the invention consists of a dispensing system wherein a selected one or a predetermined blend of plural grades of gasoline may be metered to provide an individual pulse count output at each grade meter, and whereupon all of the pulse count outputs are processed through a multiplexer to derive a pulse train which can then be computationally processed to determine and display the exact number of gallons and exact price of gasoline dispensed, at both remote and local locations.

Therefore, it is an object of the present invention to provide a fully automated gasoline dispensing system.

It is also an object of the invention to provide a gasoline dispensing system which enables more accurate computation of dispensed product.

It is yet another object of the present invention to provide a gasoline dispensing system which enables continual complete inventory for a station installation.

It is another object of the present invention to provide an electronic computational device which provides count output for display of gallons and price for a multi-grade dispensing system.

Finally, it is an object of the present invention to provide an improved gasoline dispensing electronic calculator which is more accurate and much less susceptible of failure in operation.

Other objects and advantages of the invention will be evident from the following detailed description when read in conjunction with the accompanying drawings which illustrate the invention.

BRIEF DESCRIPTION OF THE DRAWINGS

FIG. 6 is a schematic diagram of pulse multiplier circuitry as utilized in the invention;

FIG. 9 is a schematic diagram of display driver circuitry as utilized in the invention.

DETAILED DESCRIPTION OF THE INVENTION

Figure 1:
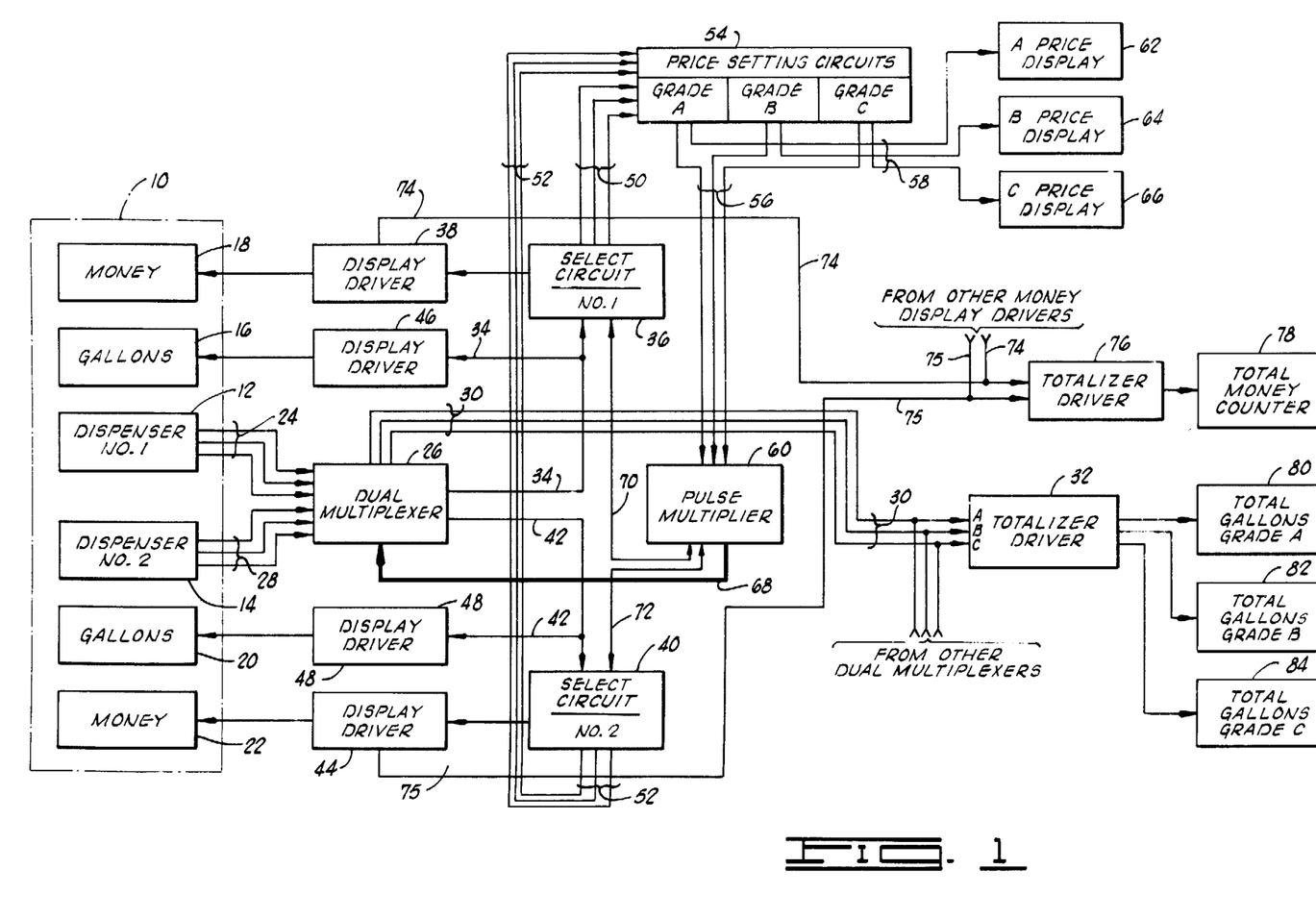
FIG. 1 is a block diagram of a gasoline dispensing station utilizing the dispensing system as constructed in accordance with the present invention.

Referring now to FIG. 1, a dispenser station 10 may consist of two separately operable dispensers 12 and 14, each of which includes respective display indicators associated therewith. Thus, dispenser 12 operation is indicated by gallons display 16 and money display 18 while dispenser 14 usage is indicated by gallons display 20 and money display 22.

Dispenser 12 is shown as including three output lines 24 which provide individual meter pulse outputs for input to a dual multiplexer 26. Similarly, dispenser 14 provides meter pulse outputs via parallel leads 28 for input to the dual multiplexer 26. The three lead groups 24 and 28 represent meter pulse outputs for three different grades or separate types of gasoline, which for example, are identified as grade A, grade B and grade C in the present specification. However, it should be understood that a multi-grade system consisting of blends from two stable gasoline sources, i.e. regular and premium gasoline, as is the subject matter of the aforementioned related patent application, is readily adaptable for dispensation in the invention as shown in FIG. 1. Thus, actual metering may take place utilizing either of the structures of FIGS. 2 or 3, as will be further described below.

Any one of leads 24 or dispenser 14 leads 28 may have an electronic pulse output which is indicative of the flow of a particular grade A, B or C of gasoline being metered. Thus, dispenser 12 may have meter pulse output on only a single one of leads 24 to multiplexer 26, or, in the case of selection of a blend of dispensing, two or more leads of group 24 may have electronic meter pulse output. In addition, one or more of leads 28 from dispenser 14 may also be providing meter pulse output to dual multiplexer 26. The meter pulses represent .01 gallon flow and are called .01 gallon pulses as input to dual multiplexer 26 which serves to scan all inputs and order the pulse count through for output to the proper associated dispenser circuitry, as will be further described below.

The dual multiplexer 26 provides output via leads 30 which carry a pulse indication of grades A, B and C flowing through either of dispensers 12 or 14 for input to a totalizer driver 32 which is remotely and centrally situated in the gasoline station. The totalizer driver 32 may receive grade A, B and C gasoline pulse indications from other dual multiplexers functioning in coaction with other dispenser stations about the filling station. Dual multiplexer 26 provides a pulse output on line 34, i.e. equal to the total number of .01 gallon quantities delivered from dispenser 12 of any grade or grade combinations, for input to select circuit 36 and gallons display driver 46.

The select circuit 34 includes actuating circuitry whereby the customer selects grade or grade blend for delivery through the respective dispenser 12. Similarly, a select circuit 40 functioning with dispenser 14 receives total .01 gallons pulses on a lead 42 while the pulses are paralleled for input to the gallons display driver 48.

The select circuits 36 and 40 also provide output via the respective three-line conductors 50 and 52 to price setting circuits 54. The inputs to price setting circuits 54 from leads 50 and 52 are enable pulses representative of respective grades A, B or C from each of select circuits 36 and 40. Within the price setting circuits 54 are three separate price setting circuits for grades A through C which consist of electric switch actuators providing a binary coded decimal output via the plural lead lines 56 and 58. Lines 56 provide a binary coded decimal (BCD) inputs to a pulse multiplier circuit 60, such BCD inputs being representative of a selected one or more of the grades A through C. At the same time, the BCD representation is applied via lines 58 to the respective grade A price display 62, grade B price display 64 and grade C price display 66.

Pulse multiplier 60 serves to provide logic control for coordinating the scan control of the dual multiplexer 26 and includes a clock oscillator, as will be further described, for use in controlling the system operation rates. A heavy line 68 represents a connection between pulse multiplier 60 and dual multiplexer 26 which includes clock pulse input, dispenser No. 1 and dispenser No. 2 pulse inputs, as well as grades A, B and C pulse inputs, for control of the dual multiplexer 26, as will be further described below. Pulse multiplier 60 also supplies interactive control connection via lines 70 and 72 with respective select circuits 36 and 40.

The display driver 38, while controlling the money display indicator 18 also is connected via line 74 to a totalizer driver 76 which functions to activate a total money counter 78 that may be centrally located in the station to count total money from all dispensing stations. Thus, an input from other money display drivers associated with other dispensing stations is also provided via line 74 and 75 which provides the same function with respect to the dispenser 14 money display driver 44. The gallons totalizer driver 32 provides similar tally on suitable gallon indicators 80, 82 and 84 indicative of total gallons of grade A, grade B and grade C gasoline dispensed from the gasoline station pump installations.

Figure 2:
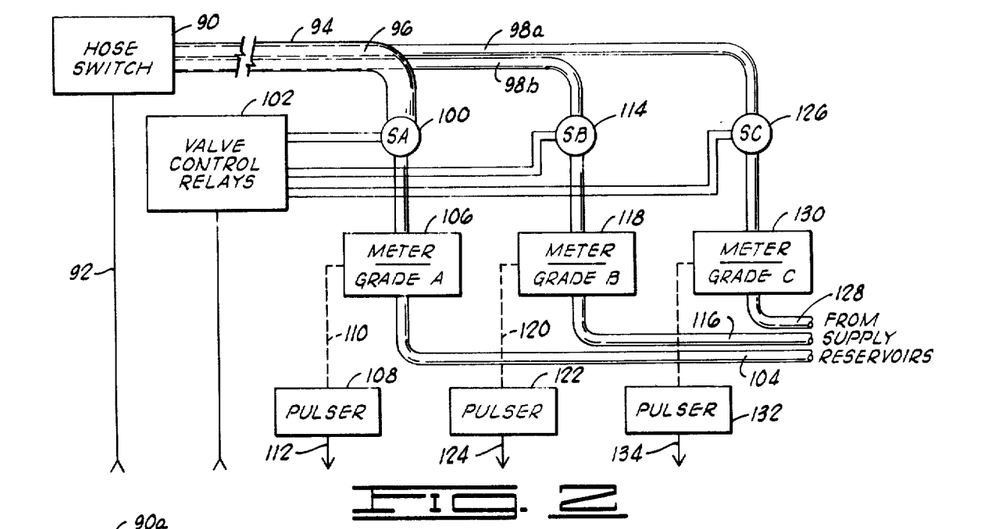
FIG. 2 is a partially schematic block diagram of the metering portion of the dispensing system of FIG. 1.
Figure 4:
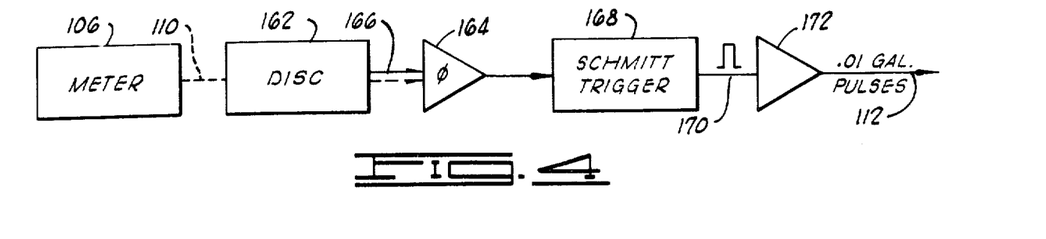
FIG. 4 is a block diagram of metering pulse count circuitry utilized in the present invention.

When the system of the present invention is utilized with a three grade dispensing system, as is the coming practice with respect to unleaded gasolines, the metering arrangement of FIG. 2 is employed. Thus, a hose switch 90 conveying control via line 92 is connected for coaction with a delivery hose 94 of the concentric type which includes an outer hose 96 and an inner hose 98. The outer hose portion 96 may be connected through a grade A solenoid valve SA 100 as controlled from valve control relays 102. When SA 100 is opened, gasoline flow is from the respective supply reservoir through delivery pipe 104 to the grade A meter 106 and through SA 100 to the outer concentric hose 96. A pulser 108 suitably activated as via linkage 110 provides a gallonage electronic pulse output indicative of flow via line 112. A preferred form of meter pulser is indicated in FIG. 4, as will be further described below.

Grade B liquid is controlled by solenoid valve SB 114 and the respective valve control relays 102 such that grade B gasoline can flow via supply tube 116 through grade B meter 118 for dispersation through the inner concentric hose 98a. A linkage 120 to pulser mechanism 122 provides .01 gallons pulse output on lead 124. In like manner, the third manner type or grade C gasoline flow is controlled by means of solenoid valve SC 126 for flow through supply tube 128 and meter 130 (grade C), also for delivery into a second inner concentric hose 98b. A pulser 132 provides .01 gallons pulse output on lead 134.

Figure 3:
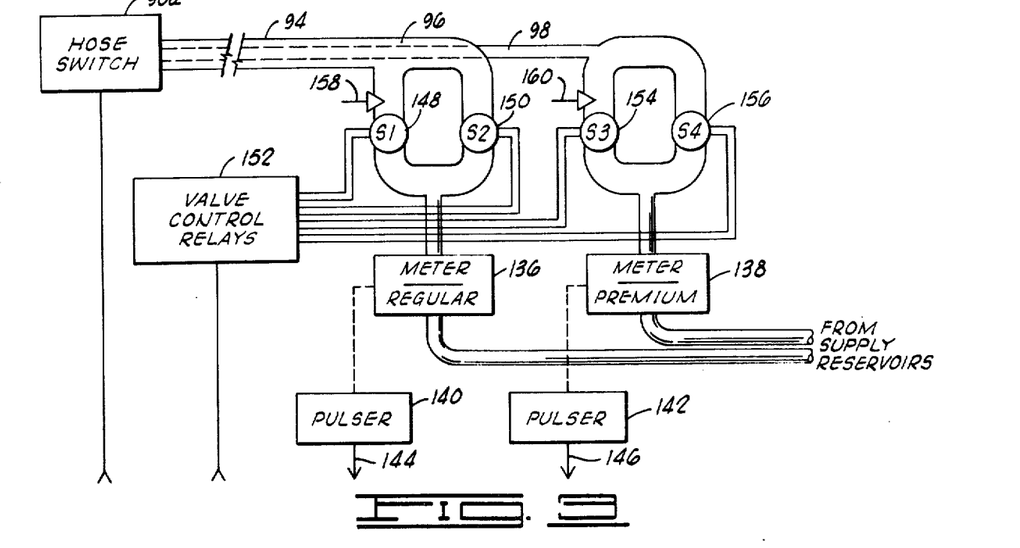
FIG. 3 is a partially schematic block diagram of alternative metering structure and circuitry as shown in FIG. 2.

If desired, an alternative form of dispensing system may be utilized, such as that of FIG. 3, which is the particular subject matter of the aforementioned related patent application. The alternative structure of FIG. 3 is intended for use with the regular/premium blending systems as have been utilized in the past. Thus, the system requires only the regular and premium meters 136 and 138 each functioning to activate a respective pulser 140 and 142 to provide .01 gallons output pulses on lines 144 and 146.

Gasoline flow from the regular meter 136 may be through one of two solenoid valves 148 and 150 as controlled by valve control relays 152 for output flow through the outer concentric hose 96. In similar manner, flow from the premium meter 138 is through one or both of solenoid valves 154 and 156 as controlled by valve control relays 152 with subsequent delivery of premium gasoline through the inner concentric hose 98. Needle valve adjustments 158 and 160 provide adjustment control for maintaining proper blend proportioning through the delivery system.

FIG. 4 illustrates one form of pulser system which may be utilized in the present invention. The .01 gallon pulses are derived from each of the grades A through C gasoline dispensing apparatus through utilization of photo-optical transducing circuitry. Thus, a liquid meter, for example grade meter 106 (FIG. 2) provides mechanical linkage or output rotation via linkage 110 to a selected form of optical shutter disc 162 which operates in conjunction with a photo-optical transducing circuit 164. The rotation through linkage 110 is such that shutter disc 162 delivers an optical response via line 166 upon delivery of each .01 gallons of the specified grade of gasoline. Such transmissive (or reflective) disc pulsing systems are well-known in the art; however, the particular transducer 164 which is employed in present systems is the RCA Type CA3062 which is an integrated circuit system consisting of a photo-optical input transponder coupled with an operational amplifier. Periodic output from transducer stage 164 is then applied to a conventional form of Schmitt trigger circuit 168 which shapes the wave to provide a square wave pulse output on line 170 to a further wave shaping amplifier 172. Pulse output of 100 pulses per gallon, i.e. .01 gallon electronic pulses, is then provided on output lead 112.

Figure 5:
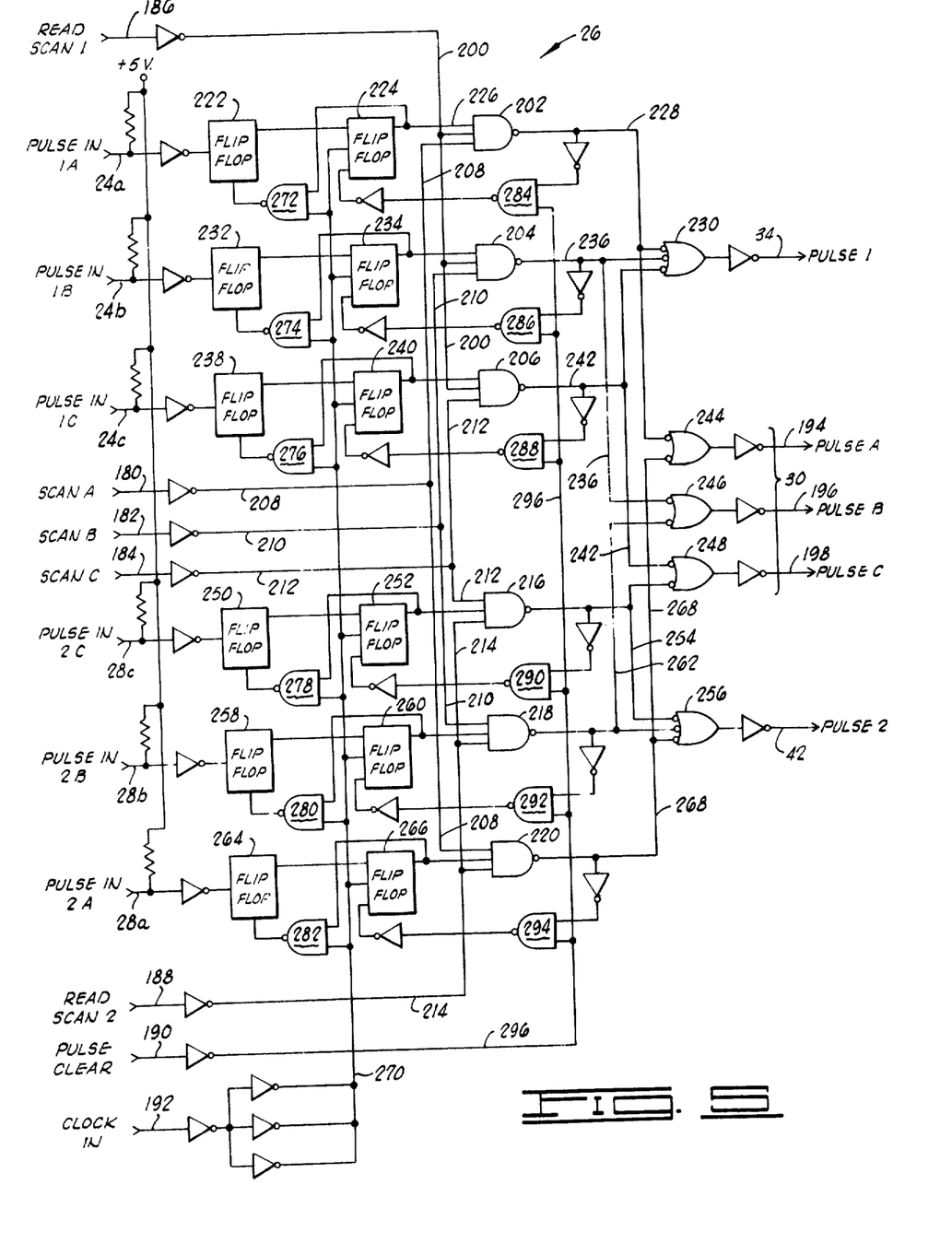
FIG. 5 is a schematic diagram of dual multiplexer circuitry as utilized in the present invention.

FIG. 5 illustrates in greater detail the dual multiplexer 26 of the invention. The dual multiplexer 26, as shown, functions with two separate gasoline dispensers each dispensing up to three separate grades of gasoline or particular blends of the three grades. Thus, dual multiplexer 26 receives .01 gallons pulses from dispenser No. 1 in one or more leads 24a, 24b and 24c, as well as dispenser No. 2 .01 gallons pulses on leads 28a, 28b and 28c. Scan A, and B and scan C inputs are received on respective leads 180, 182 and 184 from the pulse multiplier 60. Also derived from pulse multiplier 60 are the read scan No. 1 pulse input 186, read scan No. 2 pulse input 188, pulse clear pulse input 190 and clock pulse input 192. The logic of dual multiplexer 26 serves to provide totalizer output on the lead group 30, i.e. leads 194, 196 and 198, of all .01 gallon pulses for respective grades A, B and C from each of the No. 1 and No. 2 dispensers. Output on lead 34 provides count output of all grade .01 gallon pulses from dispenser No. 1 while the similar function for dispenser No. 2 is output on lead 42.

The clock input at line 192, as derived from pulse multiplier 60 and to be described below, is selected to operate at a frequency of 4 megahertz. This frequency can allow for a considerably greater number of scans than the scans 1A-C and scans 2A-C which are described herein. The scan A, B and C enabling inputs on lines 180, 182 and 184 are sequenced at one-fifth the basic clock frequency, as also will be described, and the scan 1 and scan 2 read inputs at leads 186 and 188 are sequenced at a still further division by five count, also to be described. The function of the multiplexer is to trap the input pulses (24a, 24b or 24c), which are non-synchronous to the system and to serialize these signals synchronously for the calculating and totalizing circuits.

The read scan 1 input is inverted and applied via line 200 as an enabling input to NAND gate 202, 204 and 206. Further enabling inputs to NAND gates 202, 204 and 206 are applied from respective scan A, B and C inputs which are inverted and applied via leads 208, 210 and 212. With application of a read scan 2 pulse at input lead 188, the inverted pulse is applied via lead 214 as enabling input to each of NAND gates 216, 218 and 220 while the respective NAND gates 216, 218 and 220 are further enabled sequentially by the scan A through scan C enabling pulses on leads 208, 210 and 212.

Metering pulse input on lead 24a, denoting a metering pulse from dispenser No. 1, grade A (see FIG. 1), is inverted and applied to dual J-K master-slave flip flops 222 and 224 which provide output indication on lead 226 to NAND gate 202 which, if enabling inputs are proper, applies said metering pulse via lead 228 for input to a pulse 1 NOR gate 230 for pulse 1 count output via lead 34. In like manner, pulse count input for dispenser No. 1, grade B gasoline as applied on lead 24b is stored in the J-K flip flops 232 and 234 and count output from flip flop 234, when enabled, is applied through NAND gate 204 and led 236 to NOR gate 230 with output via lead 34. Similarly, pulse input from dispenser No. 1, grade C gasoline is similarly stored by means of J-K flip flops 238 and 239 functioning through NAND gate 206, lead 242 and NOR gate 230.

It may be noted, too, that outputs from NAND gates 202, 204 and 206 are applied via lead 228, 236 and 242 to respective NOR gates 244, 246 and 248. These NOR gates 244, 246 and 248 provide individual grade metering pulse count outputs on grade pulse outputs 194, 196 and 198 to the gallons totalizer driver 32 (see FIG. 1).

Metering pulse count relating to dispenser No. 2 and any of grades A through C, as received in on one or more of leads 28a through 28c is counted through in sequential manner in the same manner as those metering pulse inputs for pulses 1A, 1B and 1C (leads 24a, 24b and 24c). Thus, metering input on lead 28c is supplied via J-K flip flops 250 and 252 through NAND gate 216 and output lead 254 for application in parallel to the gallons totalizer output NOR gate 248 (Grade C) and the pulse 2 NOR gate 256. Dispenser No. 2 grade pulses on input 28B are applied through J-K flip flops 258 and 260 and through NAND gate 218 and a lead 262 to NOR gate 256 and the grade B NOR gate 246. Dispenser No. 2, grade A gasoline metering impulses on lead 28a are stored in flip flops 264 and 266 and are cleared through NAND gate 220 upon enablement for similar output lead 268 to NOR gates 244 and 256.

Each of the respective flip flop pairs circuits in the dispenser/grade metering pulse count circuits (e.g. 222 and 224) are presently designed to be TTL integrated circuits of the Texas Instruments type SN54107. These J-K flip flops are based on the master-slave principle and inputs to the flip flop master section are controlled by the clock pulse as input on a lead 192 for inversion and application on a lead 270 as enabling to each of NAND gates 272 and 274, 276, 278, 280 and 282. After gate output from any of NAND gates 202, 204, 206, 216, 218 or 220, the respective NAND gates 284, 286, 288, 290, 292 and 294 function to hold their respective flip flop circuits in the enable condition until pulse clear input is received in on lead 190, inverted and applied via lead 296 as input to each of disable gates 284-294. The pulse clear input as applied at input lead 190 is obtained in the pulse multiplier circuit 60, as will be further described below.

Referring now to FIG. 6, the circuitry of pulse multiplier 60 is shown in greater detail. The function of the pulse multiplier 60 is to provide system synchronization as between money and gallons pulse data and to accurately equate a differential factor to the money pulses in accordance with price per gallon of the selected grade of gasoline. Thus, an enabling input on lead 300 to activate NAND gate 302 allows a multivibrator 304 as controlled by crystal 306 to generate an output oscillation on a lead 308. In the system as presently designed, the crystal 306 controls output oscillation at four magahertz.

The clock frequency oscillations on lead 308 are then available at the clock input of a J-K flip flop 310 as well as at one input to dual input NAND gate 312. A start pulse may then be received at lead 314 as it originates with one of the select circuits 36 or 40, as will be further described below. Input of the start scan signal is applied to the J input of flip flop 310 to initiate conduction in the opposite stable state while Q output on lead 190 provides a pulse clear signal for return to input lead 190 and 296 of the dual multiplexer 26 (FIG. 5). The start scan input on lead 314 is also applied to one input of a NOR gate 316 along with the Q input which controls enablement of a NAND gate 318 for connection to an input of a NOR gate 320.

Thus, application of the start scan signal at input lead 314, functioning through NOR gate 320, enables NAND gate 312 such that clock pulses from lead 308 are applied via lead 322 to the input of a rate counting network 324 consisting of cascade connected rate multipliers 326, 328 and 330. The rate multipliers 326, 328 and 330 actually serve a dual purpose in that they provide a 1,000 clock pulse count output per .01 gallons pulse occurrence, and they provide a money pulse count in accordance with binary coded decimal switch settings which provide a price proportional multiple.

Each of the plural lead groups 332, 334 and 336 provide input to the respective rate multipliers 326, 328 and 330 in the form of 8-4-2-1 binary coded decimal input originating with binary coded decimal switces in each of the price boards or grades A, B and C boards of the price setting circuts 54 (FIG. 1). Thus, if the price per gallon of the selected grade si 45.9 cents, then lead group 332 will read in a binary coded decimal 4, lead group 334 a BCD 5 and lead group 336 a BCD 9.

The rate multipliers 326, 328 and 330 are merely presettable decade counters, and in present design they are Texas Instruments type 74167. Thus, for each input start scan pulse at input lead 314, the clock pulses on lead 308 are applied through NAND gate 312 via lead 322 for input to rate multiplier 326 which counts in decade to provide one output line 340 for every 10 pulses counted in. In like manner, rate multiplier 328 provides one output on lead 342 for every ten pulses counted in on lead 340, and rate multiplier 330 provides an output on lead 344 after input of ten pulses from lead 342. Thus, when output appears at lead 344 one thousand clock pulses will have been counted, and the output pulse on lead 344 is conducted back to the K input of flip flop 310 thereby reversing its state and closing NAND gate 312 to further passage of clock pulses. At the same time, reversal of the NOR gate 316 is reflected via lead 346 as the scan stop signal which is applied through a NAND gate 348 to activate divide-by-five counter 350 through one count.

Counter 350 is a well-known form of divide-by-five counter, Signetics Type 7490, which provides five sequential output indications for successive enablement of NAND gates 352, 354 and 356, and a final output via lead 358 energizes an identical form of divide-by-five counter 360. The counter 360 operates in similar manner to successively energize NAND gates 362, 364, 366 and, finally, output lead 368. Through the count sequence the scans A, B and C are successively enabled each for 1,000 clock pulses which the scan one output on lead 186 (to dual multiplexer 126) is energized.

Upon cycling at the five count, the enablement moves on to NAND gate 364 and the scan 2 output lead 188 (to dual multiplexer 26) whereupon the divide by five counter 350 recycles to successively energize outputs on each of scan A, scan B and scan C. Other scans are available and the system can be enlarged to include additional scans either for pump dispensers or for gasoline grades.

While the rate multiplier network 324 is carrying through the one thousand pulse count, each of the individual rate multipliers 326, 328 and 330 provides an additional pulse count output which relates directly and in proportion to money count. Thus, the BCD control inputs to each of rate multipliers 326, 328 and 330 are controlled by the BCD lead groups 332, 334 and 336 from the select boards, and the BCD inputs control count output at respective leads 370, 372 and 374. Thus, in the case where the gasoline price board sets the price at 45.9 cents per gallon, a count-through of 1,000 pulses (per .01 gallons delivery) through rate multiplier network 324 will result in the outputting of 400 pulses at output 374, plus fifty pulses through lead 372 to output 374, plus nine pulses through leads 370 and 372 to output 374, for a total of 459 pulses which are then applied via lead 374 for application to one of the select boards 36 or 40, as shown in FIG. 7.

Figure 7:
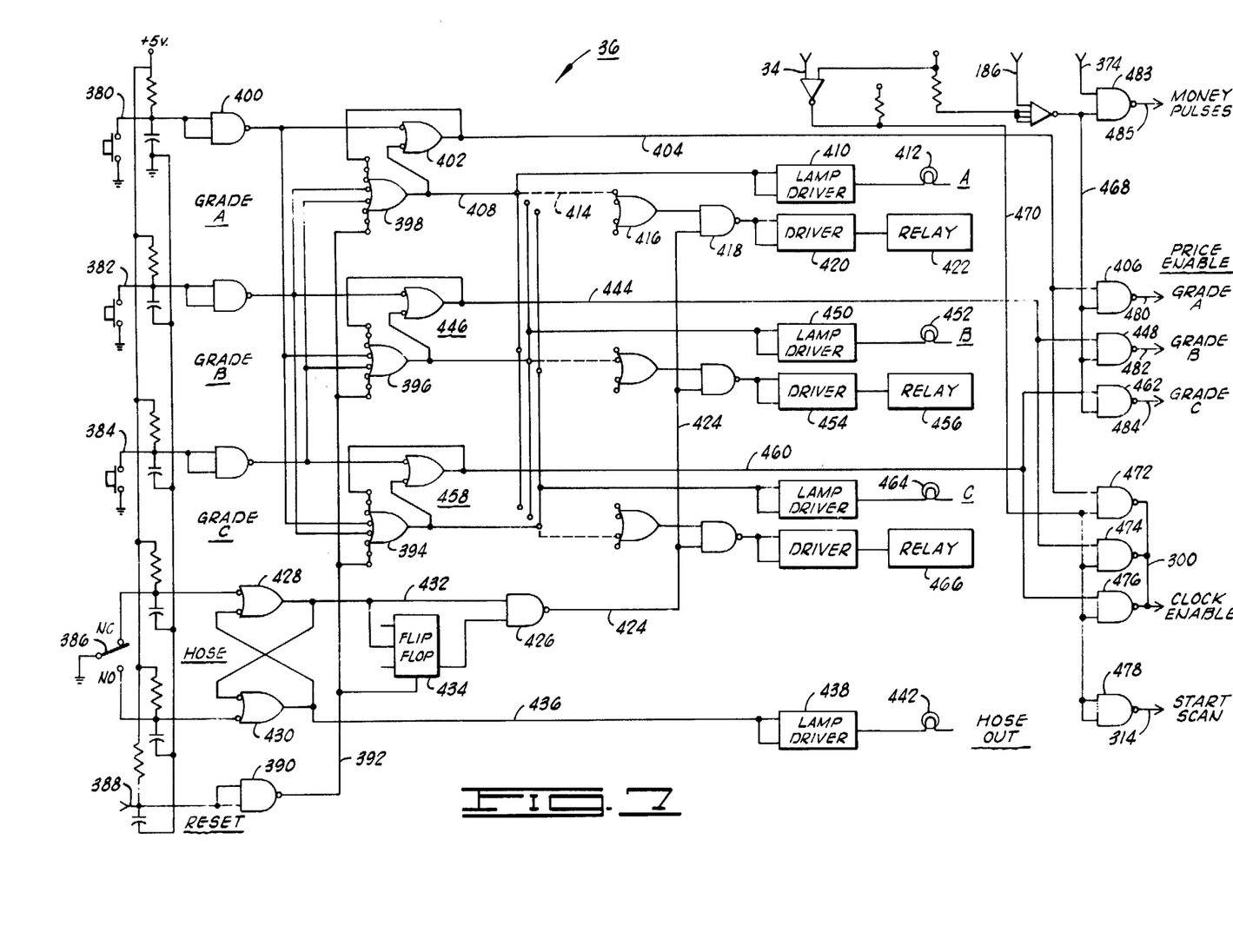
FIG. 7 is a schematic diagram of grade select circuitry as utilized in the present invention.

FIG. 7 is a schematic diagram of a select board or select circuits 36 and 40 of FIG. 1. Each of select circuits 36 and 40 are identical, one being utilized for dispensing selection at dispenser No. 1 while the other is used in conjunction with dispenser No. 2, i.e. dispensers 12 and 14 (FIG. 1). Select circuit 36 incudes three panel-mounted pushbutton switches 380, 382 and 384 whereby the customer can select the grade of gasoline to be delivered. A switch 386 is disposed at the delivery hose holster and is the type which is normally closed when the hose is out of its holster as is shown in FIG. 7. System reset pulse, as generated when initially starting system operation, is input at a lead 388 for conduction through NAND gate 390 and switching of enabling lead 392 as applied to each of NOR gates 394, 396 and 398.

Actuation of pushbutton 380 is conducted through NAND gate 400 to NOR gate 402 and via lead 404 for input to a NAND gate 406. The NOR gates 398 and 402 in combination provide a latching circuit which mainains the actuation on lead 404 if the lead 392 is properly in reset conduction, and lead 404 is fed back for input to the NOR gate 398 thereby maintaining output lead 408 in proper latching condition. Lead 408 is also applied through a lamp driver 410 to energize an indication lamp 412 which notifies the customer that the grade A selection has been made, and that dispensing can commence as controlled by the delivery hose. A similar connection 414, shown in dash-line since it is a variable connection depending upon the type of multi-grade system in use, is applied through a NOR gate 416 and NAND gate 418 to a relay driver 420 for actuation of the associated grade A relay 422. The relay 422 may be one of the valve control relays 102 as shown in FIG. 2, or the connection may be made directly to relay SA100. The NAND gate 418 is enabled by input on lead 424 from a NAND gate 426 which is responsive to the hose out condition to provide enabling output. Thus, with the hose out, as shown in FIG. 7, the NOR gates 428 and 430, shown in latching configuration, provide output via lead 432 through NAND gate 426 as enabled by a flip flop 434 in response to the reset condition. Output lead 436 from NOR gate 430 is applied to energize a lamp driver 438 which, in turn, energizes a front panel indicator lamp showing the "hose out" condition.

Selection of grade B gasoline by depression of pushbutton 382 functions in identical manner to that of grade A. That is, the proper conduction condition is placed on lead 444 as latched by latching gates 446 for application to one input of NAND gate 448. Also in like manner, a lamp driver 450 energizes indicator lamp 452, and a relay driver 454 energizes the valve relay 456. Grade C gasoline is dispensed in the same manner with depression of pushbutton 384 and latching of NOR gates 458 to provide proper conduction on lead 460 to the grade C NAND gate 462. The latching NOR gates 458 also effect energization of the lamp driver and grade C indicator lamp 464, as well as the relay driver and valve relay 466.

The output NAND gates 406, 448 and 462 are each enabled via condition of line 468 which is controlled by input to lead 186 from the pulse multiplier 60 (FIG. 6). That is, the scan 1 output on lead 186 from pulse multiplier 60 would be applied to select circuit 36 for the number one dispenser; however, the select circuit 40 or No. 2 dispenser circuitry, would be energized by the scan 2 output on lead 188 from the pulse multiplier 60 (FIG. 6). Input on lead 34 derived from the dual multiplexer 26 (i.e. designated the pulse 1 output) is applied on lead 470 as enabling input to NAND gates 472, 474 and 476, and further for output via NAND gate 478 as the start scan pulse on lead 314 to pulse multiplier 60 (FIG. 6). The NAND gates 472, 474 and 476, when enabled, will further conduct output indication from the selected one of leads 404, 444 or 460 as the clock enable output on lead 300, also for application to pulse multiplier 60 (FIG. 6).

Figure 8:
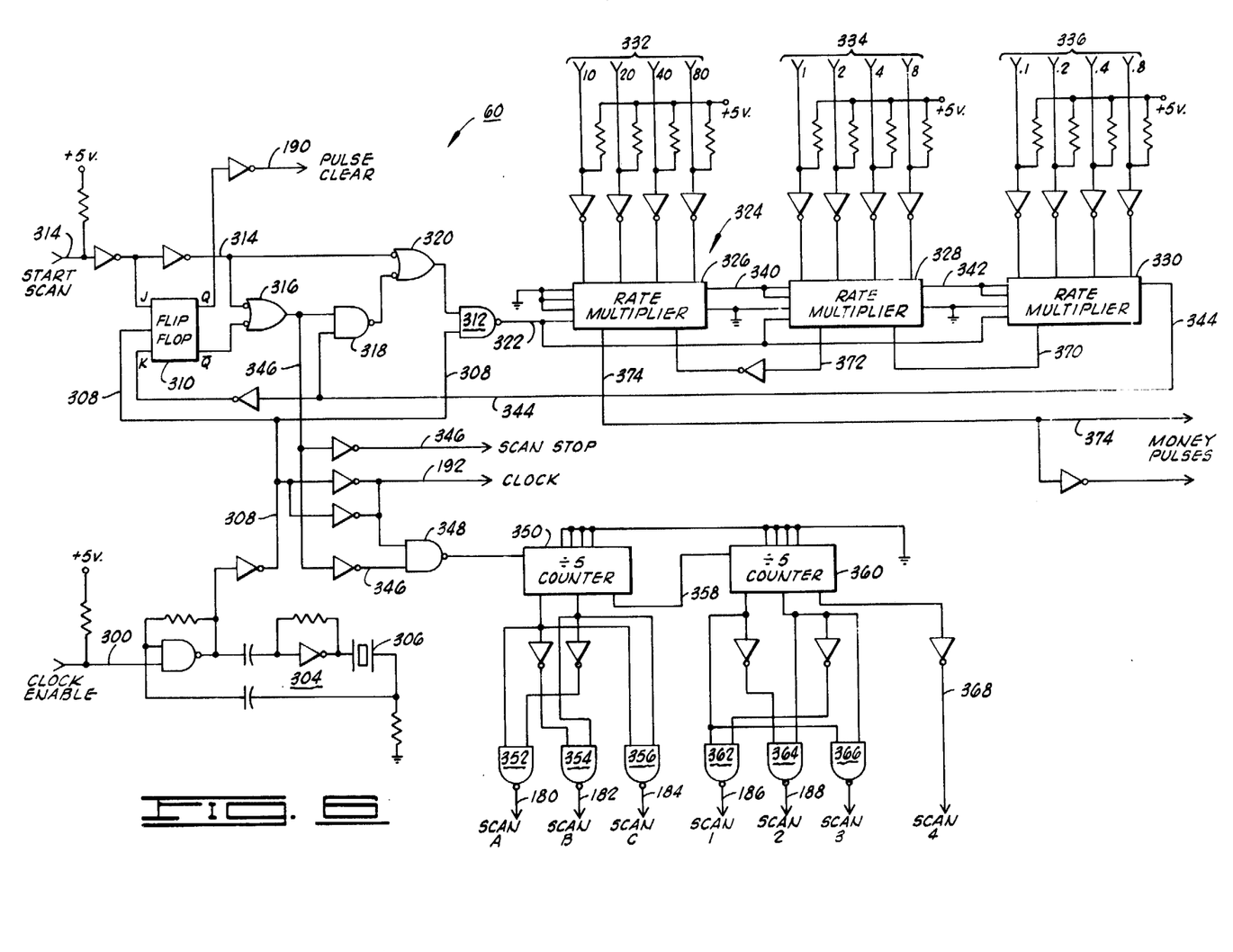
FIG. 8 is a schematic diagram of price setting circuitry as utilized in the invention.

The price enable outputs 480, 482 and 484 are each applied to a respective price setting circuit within the price setting circuits 54 (FIG. 1). There is a separate price setting circuit for each of the grade A, grade B and grade C gasolines, and price setting circuit 54A as employed for grade A gasoline is shown in FIG. 8. Thus, the grade A price enable input from lead 480 (FIG. 7) is applied as an enabling input on lad 486 to each of a plurality of output NAND gates 488, 490, 492, 494, 496, 498, 500, 502, 504, 506, 508 and 510. BCD switches 512, 514 and 516 are employed to set the price of dimes, pennies and mils, respectively. The BCD switches 512 through 516 are thumb wheel switches which can be dialed to the selected value, and which will provide BCD outputs on respective lead groups 518, 520 and 522. The BCD thumb wheel switches are a commercially available switch, Model No. 49902–407 as manufactured by Durant Company of Milwaukee, Wis.

The BCD output on lead group 518 is applied to respective NAND gates 488 through 494, which, when enabled via price enable on lead 486, provide the respective BCD outputs on lead group 332 as applied into the rate multiplier 326 of pulse multiplier 60 (FIG. 6). Similarly, pennies data as present in BCD form on lead group 520 is applied through gates 496–502 and via lead group 334 to rate multiplier 328 (FIG. 6); and in like manner, the mils BCD data on lead group 522 is applied through NAND gates 504 – 510 and on lead group 336 for input to the rate multiplier 330 (FIG. 6).

The BCD data from each of lead groups 518, 520 and 522 are also applied to respective seven segment decoders 524, 526 and 528 for the purpose of providing customer display of the price per gallon of the various grades of gasoline, in this case the price of grade A gasoline. Thus, decoded outputs from the decoders 524, 526 and 528 are applied through lamp driver groups 530, 532 and 534 which, in turn, are connected to the respective indicators 536, 538 and 540 for dimes, pennies and mils, respectively. The seven segment decoders 524 – 528 are Signetics 8T04 type integrated circuits operating through conventional lamp drivers 530 – 534 which are connected to control indicators of the RCA Numatron type electronic indicator.

FIG. 9 is a schematic diagram of a display driver, in this example the display driver 38, which is employed in driving the money indication 18 or the gallons indication 16. Actually, all of display drivers 38, 46, 48 and 44 employ the same circuit board as is shown schematically in FIG. 9. Thus for derivation of money count and indication, the entire circuitry shown by bracket 550 is utilized with money pulses input on lead 485 (FIG. 7), and with an interconnection 452 conducting a preprocessed money output pulse from lead 554 back for input to an inverter 556 and the decoding and indicating circuitry, as will be further described. In the case of gallons count, .01 gallons pulses output on lead 34 from the dual multiplexer 26 (FIG. 1) are connected directly to the decoder and indicator circuitry.

Dealing first with the input money pulses on lead 485, it will be recalled from the circuitry of FIG. 6 or pulse multiplier 60, that the money pulses output was derived in accordance with price per gallon in proportion to a 1,000 pulse count. In that case, with the price per gallon assumed to be 45.9 cents per gallon, the money pulses amounted to 459 pulses per scan out of the total 1,000 pulses per scan. The money pulses are then input to BCD counter stages 560, 562 and 564 with output via line 566 to a one shot multivibrator 568. A clear pulse, as input on lead 190 from pulse multiplier 60 (FIG. 6), is applied via lead 570 to effect clearing of all BCD counters.

The one shot multivibrator 168 then provides output on lead 554 and via the interconnect linkage 552 for input to a BCD counter 572. BCD counters 572, 574, 576 and 578 are serially connected to provide BCD output indications via respective lead groups 580, 582, 584 and 586 for input to respective seven segment decoders 588, 590, 592 and 594. The BCD count and decoder circuitry of FIG. 9 is similar to that which was described with respect to FIG. 8. That is, each of the seven segment decoders 588 through 594 drives respective lamp driver groups 596, 598, 600 and 602 which, in turn, control the respective RCA Numatron type numeral indicators 604, 606, 608 and 610.

When the display driver 548 is used for money tally, the indicators 604 through 610 read out in pennies, dimes, dollars and tens of dollars, respectively, with the decimal point between indicators 606 and 608. The BCD counter circuits are TTL integrated circuits of the Signetics type 7490, the seven segment decoder is Signetics type 8T04, and the one shot multivibrator 568 may be such as a Signetics Type 74121.

When circuit board 548 is used as a gallons display driver, e.g. display drivers 46 and 48, only the portion of the circuit indicated by bracket 612 is utilized. That is, the .01 gallon pulses are applied directly via input lead 34 to the BCD counter 572. Thereafter, the BCD counters 572 through 578 function in the same manner to drive the respective seven segment decoders through 594 such that gallons indication is registered on indicator 604, 606, 608 and 610. Such gallons indication takes the form of hundredths gallons, tenths, gallons, decimal point, units gallons and tens of gallons.

Figure 10:
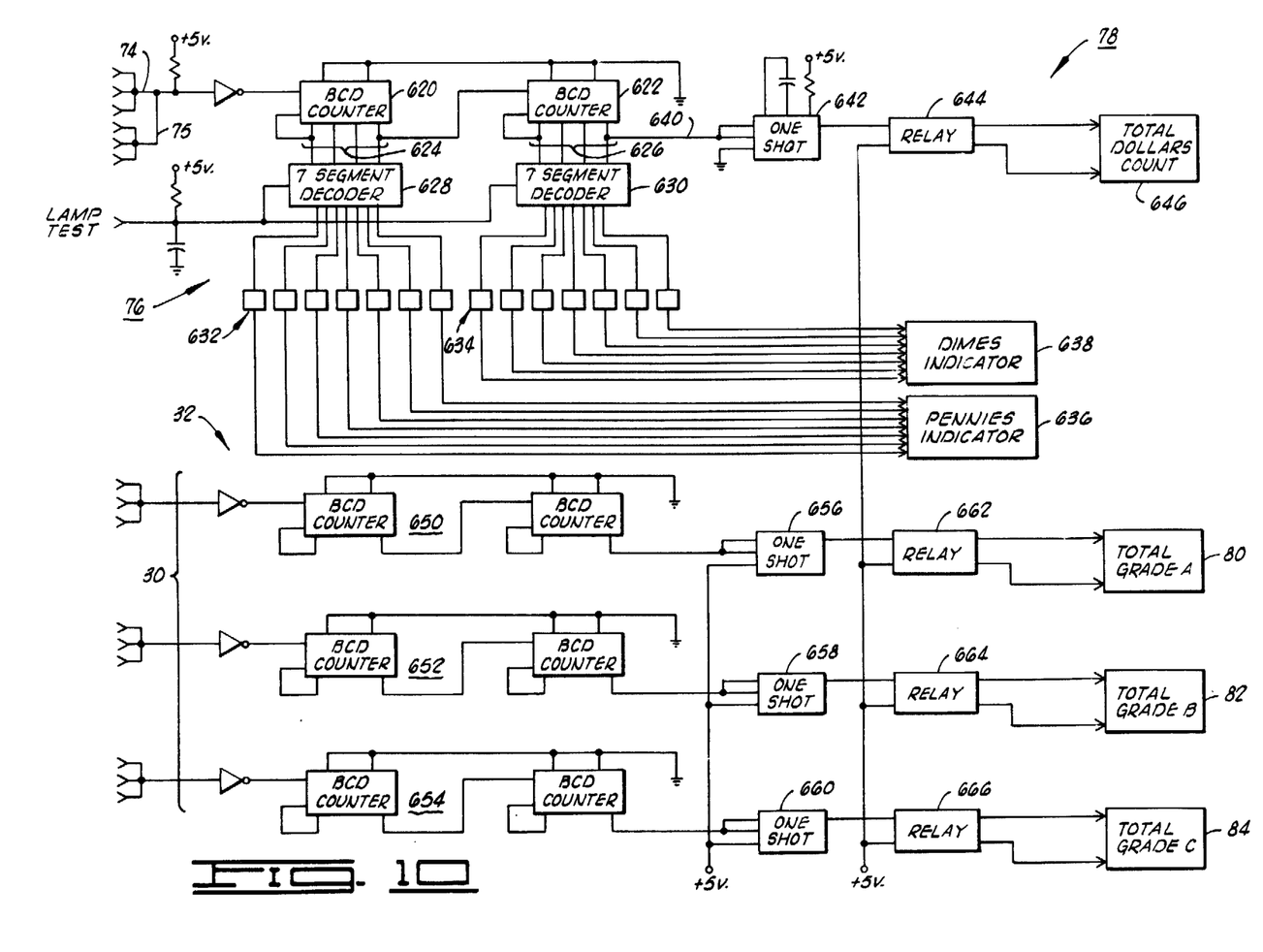
FIG. 10 is a schematic diagram of totalizer circuitry as utilized in the present invention.

FIG. 10 is a schematic diagram of the totalizer interface which includes totalizer driver 76 driving the money counter 78, as well as a totalizer driver 32 which drives the total gallons registers 80, 82 and 84 that indicate the total gallons of grade A, grade B and grade C gasoline dispensed from all installations.

Money pulses, input leads 74 and 75, are applied to sequential BCD counters 620 and 622 which provide BCE count output on lead groups 624 and 626 to the respective seven segment decoders 628 and 630. The output from decoders 628 and 630 are then applied through respective lamp driver groups 632 and 634 each having outputs connected to respective pennies indicator 636 and dimes indicator 638. The BCD counters, seven segment decoders, lamp drivers and indicators may be integrated circuitry similar to that employed in FIGS. 8 and 9.

The dollars or hundred count output from BCD counter 622 is taken off on a lead 640 for actuation of a one shot multivibrator 642 which actuates a drive relay 644 in control of a total dollars count indicator 646. The count indicator 646 may be a well-known form of electro-mechanical counter to as many places as desired.

The gallons count is derived from lead groups 30, from dual multiplexers 26 (FIG. 1), and such gallons count can be input from any of a plurality of dispenser stations 10 about the filling station. Thus, the count on lead group 30, for each of grades A, B and C gasoline, are applied through sequential BCD counter pairs 650, 652 and 654 to drive respective one-shot multivibrators 656, 658 and 660. Outputs from the respective one shots 656, 658 and 660 are then used for actuation of respective relays 662, 664 and 666 which in turn drive tally indicators 80, 82 and 84 for totalization of grade A, grade B and grade C gasoline dispensed at the particular installation.

The foregoing discloses a novel gasoline dispensing system which constitutes a very great improvement over existing mechanical types of systems as the system avoids the inherent problems encountered with respect to accuracy of metering and tally. The present system provides total meter reliability as to accuracy of gallonage delivery and cost per gallon while also affording the attendant advantage of electronic circuitry reliability. The utilization of digital valve control and grade blending in the delivery line provides highly reliable and accurate blending while presenting minimal problem areas. The system of the present invention can be utilized in any number of gasoline station arrangements for delivery of any number of blends or grades of purchase delivery practice. In addition, the system lends well for utilization with coin or check acceptance devices which may soon serve to automate even further the practice of gasoline sales.

Changes may be made in the combination and arrangement of elements as heretofore set forth in the specification and shown in the drawings; it being understood that changes may be made in the embodiment disclosed without departing from the spirit and scope of the invention as defined in the following claims.

What is claimed is:

1. A gasoline dispensing system for delivery of gasoline from one or more supply reservoirs comprising:
    plural dispensing means, each including metering means, for actuation to dispense gasoline from selected ones of plural supply reservoirs;
    plural circuit means each generating an electrical pulse output as a predetermined rate in proportion to the amount of gasoline flow dispensed through a respective one of said plural dispensing means;
    multiplexing means receiving electrical pulse outputs from each of said plural circuit means to provide plural, time sequential pulse output groups;
    scanning means including a clock oscillator for controlling scanning rate of said multiplexing means such that a sequential pulse output group may be generated for each of the respective plural dispensing means;
    rate multiplier means including counting circuitry which is controlled by said scanning means to receive input of said sequential pulse output groups and to generate a sequential money pulse output for each of the respective pulse output groups, each money pulse output being at a preselected pulse rate in proportion to total pulses of the respective pulse group;
    plural input means controlled by said scanning means to provide sequential binary coded decimal inputs to said counting circuitry to preselect the proportional rate of each money pulse output; and
    plural means indicating each of said pulse output groups as gallons dispensed and indicating each of said money pulse outputs.

2. A gasoline dispensing system as set forth in claim 1 which further characterized in that:
    each of said plural dispensing means is connected to plural metering means each further connected to selected ones of plural different supply reservoirs.

3. A gasoline dispensing system as set forth in claim 1 wherein said scanning means further comprises:
    clock oscillator means providing pulse output at a preselected frequency;
    first counter means receiving said clock pulse output and providing a divided count output periodically;
    second counter means receiving said periodic output from said first counter means and providing a further divided pulse output periodically;
    first gate means periodically enabled by the output of said first counter means to provide successive scan enabling inputs to said multiplexer means to enable output from the multiplexer means of electrical pulse outputs from different metering means of the same dispensing means; and
    second gate means enabled by output from said second counter means to enable input through said multiplexing means of electrical pulse output from a selected dispensing means.

4. A gasoline dispensing system as set forth in claim 1 wherein said rate multiplier means further comprises:
    first, second and third serially connected decade counters operative synchronously with each sequential pulse output group to provide a one thousand count output which disables the input to said counting circuitry to cease output of said sequential money pulse output.

5. A gasoline dispensing system as set forth in claim 3 wherein said rate multiplier further comprises:
first, second and third serially connected decade counters operative synchronously with each sequential pulse output group to provide a one thousand count output which disables the input to said counting circuitry to cease output of said sequential money pulse output.

6. A gasoline dispensing system as set forth in claim 1 which is further characterized to include:
totalizing means receiving all electrical pulse outputs from said multiplexing means to provide a total count indication of gallons dispensed; and
totalizing means receiving all of said money pulse outputs to provide an indication of total money count.

7. A gasoline dispensing system for controlling delivery of gasoline from plural dispensers each selectively operable to dispense a selected one of plural grades of gasoline from respective plural supply reservoirs, the apparatus comprising:
means controlled by flow of gasoline from each of said supply reservoirs for generating an electric pulse output at a predetermined rate proportional to said flow;
clock means operating at a predetermined frequency to provide an output scan control pulse;
multiplexer means receiving input of said electric pulse output and being enabled by said scan control pulse to generate an output gallons pulse;
indicator means receiving said gallons pulse to indicate continually total gallons flow;
select circuit means operable to enable a selected one of said plural dispensers and plural grades of gasoline for dispensing delivery, said select circuit means receiving input of said electrical pulse output for said selected dispenser and grade and providing a characteristic select pulse output;
rate multiplier means receiving input of said select pulse output and effective to generate a money pulse output which provides a preselected proportional number of money pulses relative to a preset number of said input select pulses; and
indicator means receiving input of said money pulse output to provide continual indication of price of the amount of flow.

8. Apparatus as set forth in claim 7 wherein said clock means further comprises:
oscillator means providing pulse output at a predetermined frequency;
counter means receiving input of said clock means pulse to provide sequential enabling outputs to said multiplexer means to enable input of electric pulse outputs from each of said means controlled by the flow of gasoline for each of the plural grades of each of the plural dispensers.

9. Apparatus as set forth in claim 8 wherein said clock means further comprises:

first counter means receiving input of said clock means pulse output to provide output, after a predetermined count, of a grade enable pulse; and
second counter means receiving input of the grade enable pulses to provide an output after a predetermined pulse count of a scan enable pulse such that all grade enable pulses are sequentially enabled for each dispenser scan enable pulse.

10. Apparatus as set forth in claim 9 wherein said multiplexer means further comprises:
a plurality of gate means each selectively enabled by input of a respective dispenser scan and grade enable pulse to enable output of an electric pulse output corresponding to the particular selected dispenser and grade.

11. Apparatus as set forth in claim 10 wherein said multiplexer means is further characterized in that:
the selection of more than one grade of said plural grades of gasoline in said select circuit means provides a summed output of electric pulse outputs from said multiplexer means for input to said indicator means.

12. Apparatus as set forth in claim 10 which is further characterized to include:
rate multiplier means enabled in synchronism with said sequential dispenser and grade scan enable pulses and simultaneously receiving said selected electric pulse output such that it is effective to generate a money pulse output which provides a preselected proportional number of money pulses relative to a preset number of said electrical pulses during said selected enabling interval; and
indicator means receiving input of said enabled money pulse output to provide continual indication of the price of the amount of flow.

13. Apparatus as set forth in claim 12 which is further characterized to include:
plural totalizing means each receiving a selected grade electrical pulse output from said multiplexing means to provide a total count indication of gallons dispensed for each grade; and
totalizing means receiving all of said money pulse outputs to provide an indication of total money count.

14. Apparatus as set forth in claim 7 wherein said rate multiplier means further comprises:
first, second and third counter means connected serially to provide pre-selected pulse count output of tens, units and tenths, respectively, for output as said money pulse output.

15. Apparatus as set forth in claim 14 wherein said rate multiplier means further comprises:
first, second and third-wheel switches each actuatable to provide a pre-selected binary coded decimal output for input to said first, second and third counter means, respectively, thereby to control said money pulse output.

* * * * *